United States Patent [19]

Albert, Jr.

[11] 4,395,802
[45] Aug. 2, 1983

[54] BENDING STRAIN RELIEF

[75] Inventor: Frank Albert, Jr., Parma, Ohio

[73] Assignee: Preformed Line Products, Inc., Mayfield Village, Ohio

[21] Appl. No.: 255,224

[22] Filed: Apr. 17, 1981

[51] Int. Cl.³ .................. H01R 13/58; A44B 21/00
[52] U.S. Cl. .................. 24/115 N; 174/108; 339/103 R; 339/103 C; 24/122.3
[58] Field of Search .......... 24/115 A, 115 N, 135 N, 24/122.3; 57/210, 906; 138/129, 133; 174/73 R, 79, 108; 339/103 R, 103 C, 104

[56] References Cited

U.S. PATENT DOCUMENTS 4,260,143 4/1981 Kliger .................. 267/148

FOREIGN PATENT DOCUMENTS 274097 9/1969 Austria .................. 339/103 R

Primary Examiner—Robert P. Swiatek
Attorney, Agent, or Firm—Fay & Sharpe

[57] ABSTRACT

A bending strain relief assembly which includes a plurality of helical band members cooperatively interdigitated to define a sleeve having a cylindrical passage therethrough for receiving a cable or hose. Each band member includes a plurality of individual helical elements encapsulated together in synthetic plastic material. Each band member also has an external grip groove on one end portion thereof for receiving a clamping flange on a clamping head. Cooperation between the clamping flange and grip grooves prevents radial separation of the band members at the one end portion thereof and prevents relative longitudinal movement between the band members and the clamping head. A holding device is positioned around the band members adjacent the other end portions for preventing radial separation thereof.

22 Claims, 23 Drawing Figures

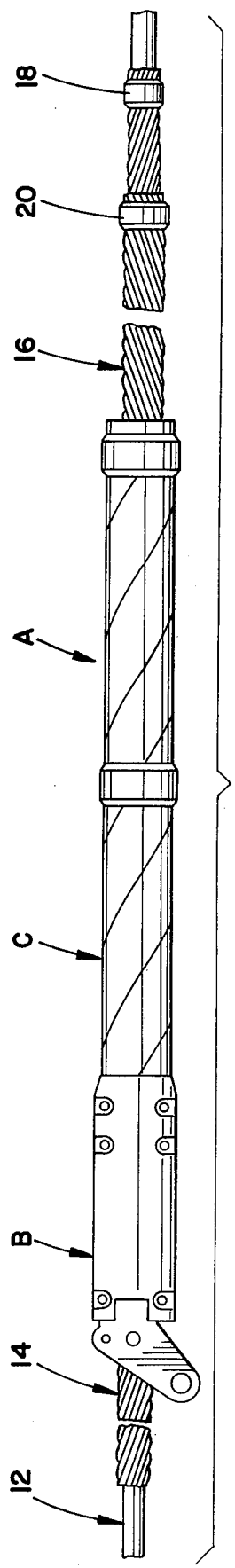
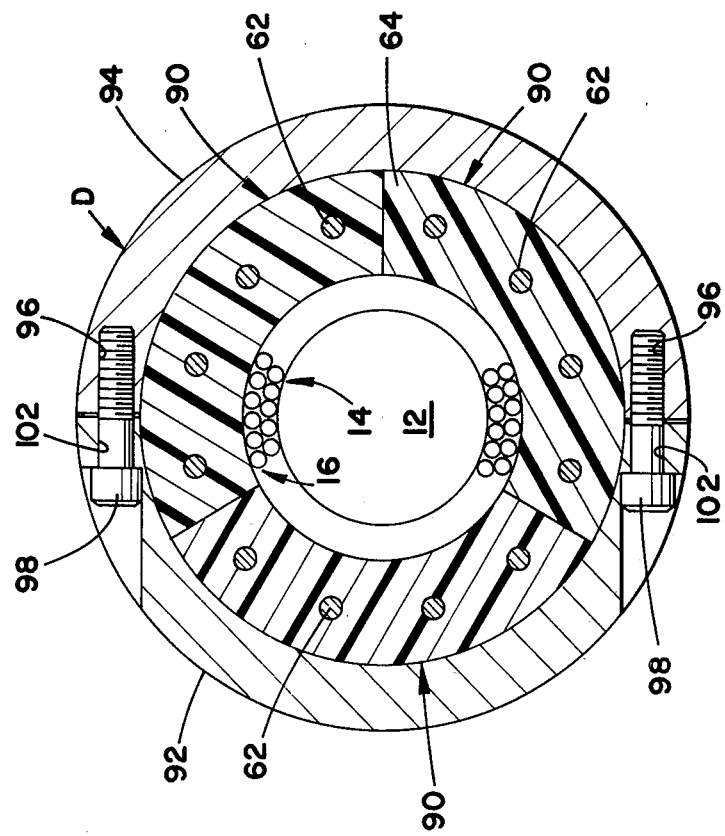

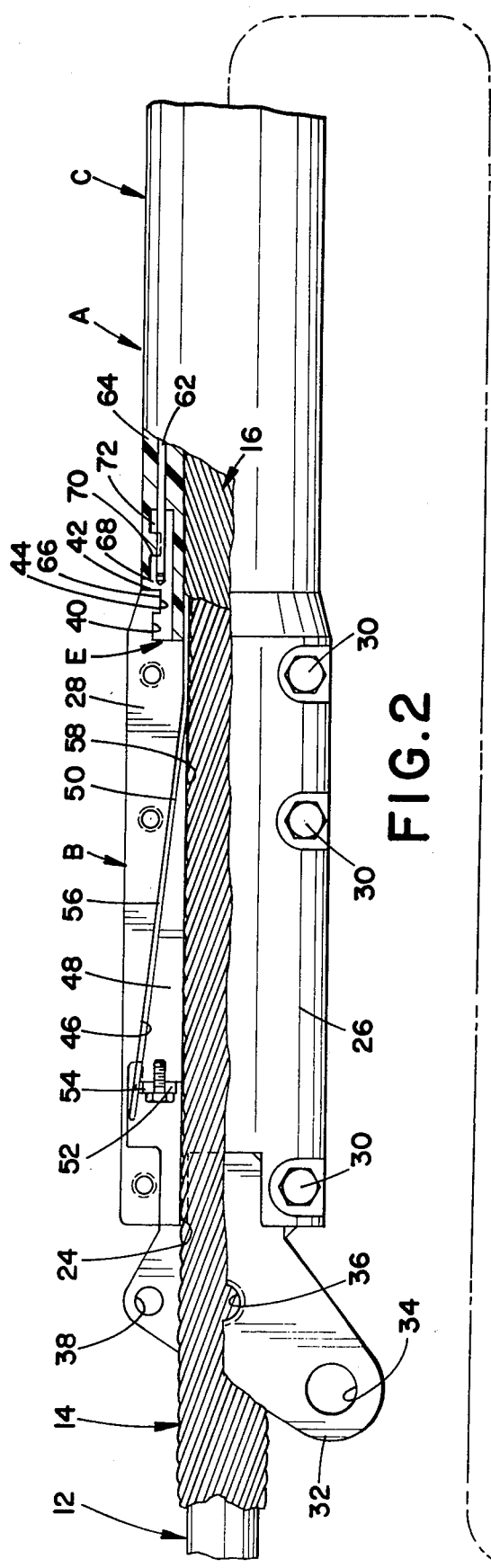
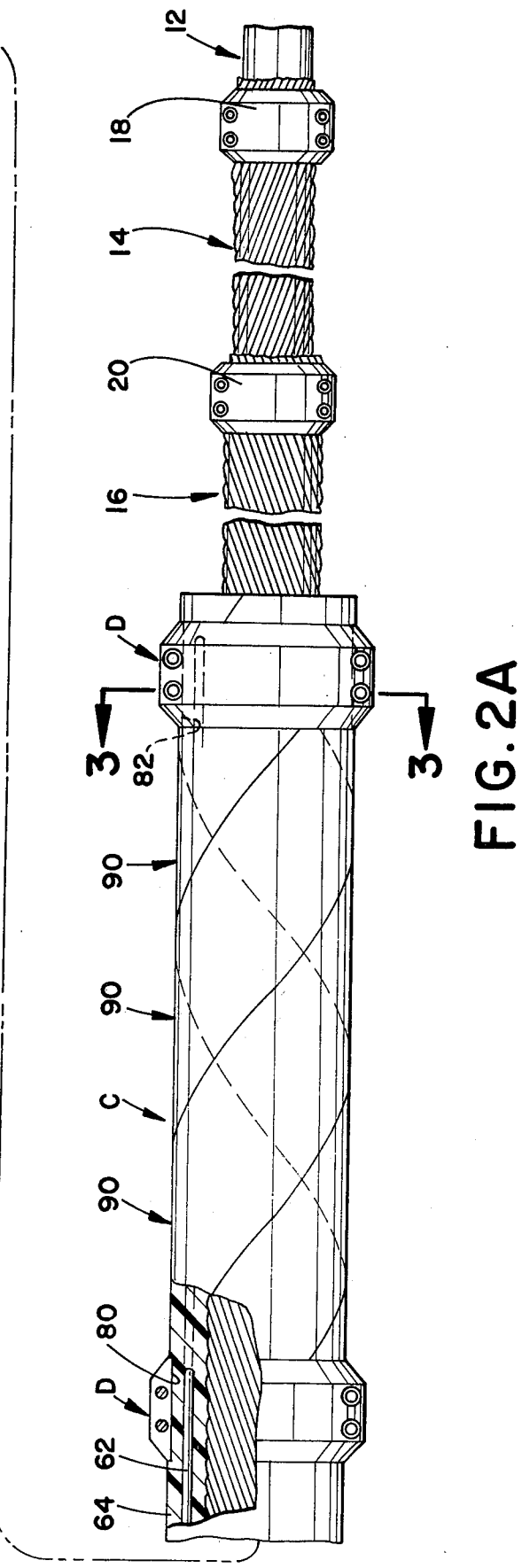
FIG. 2
FIG. 2A

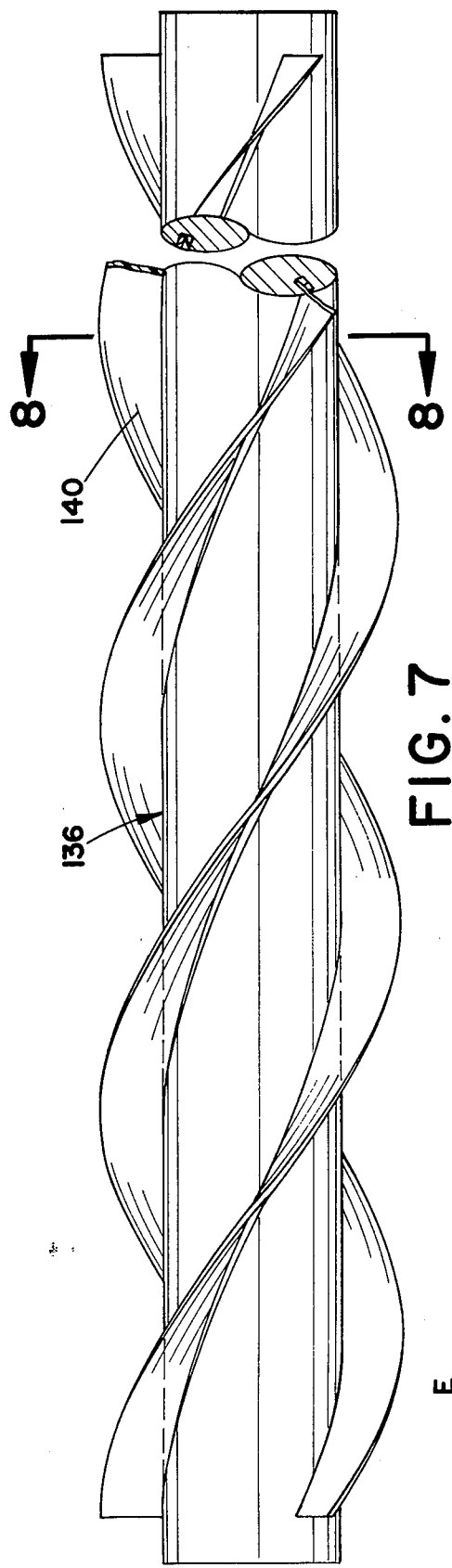
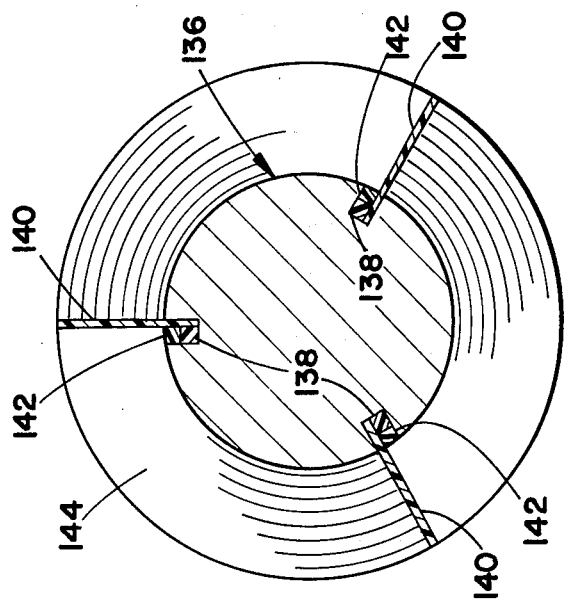
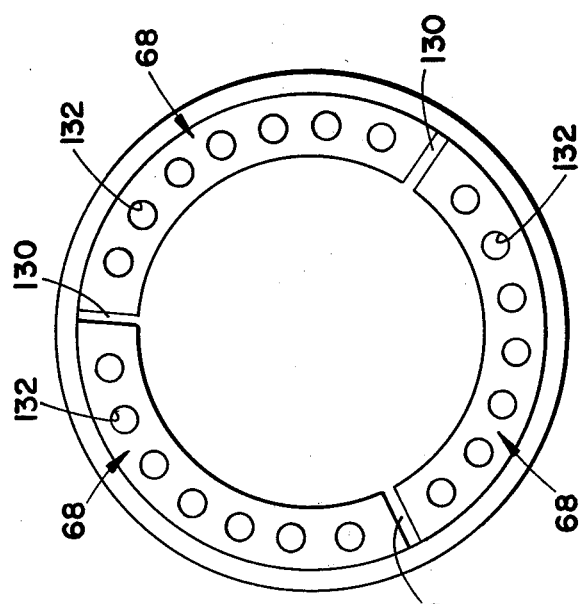
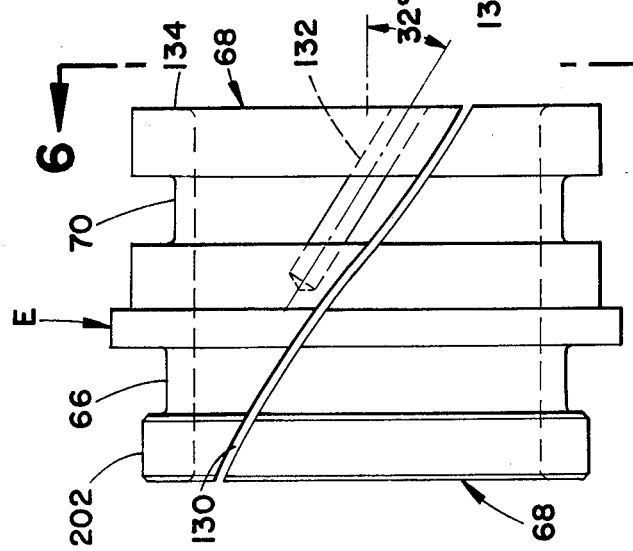

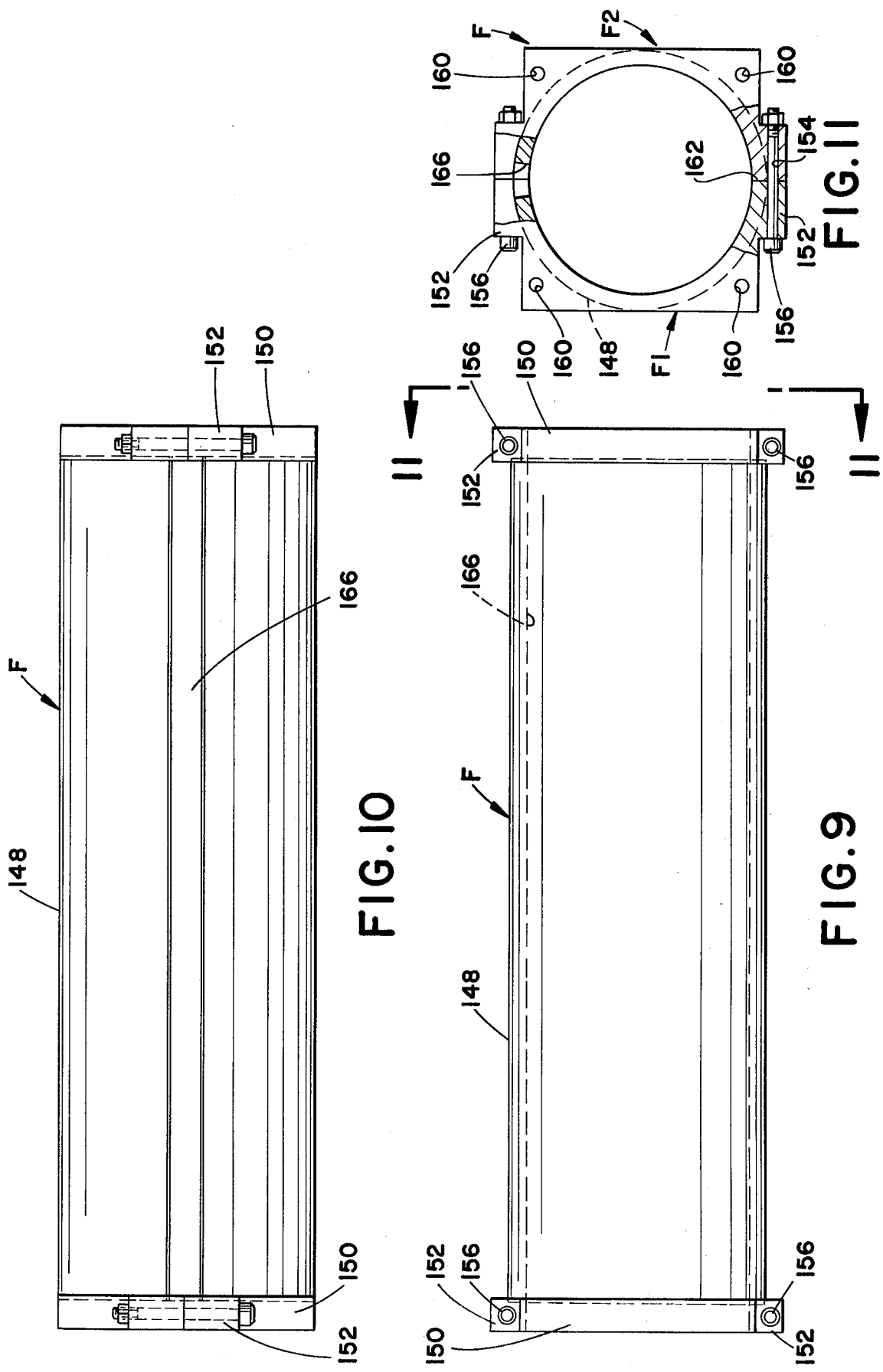

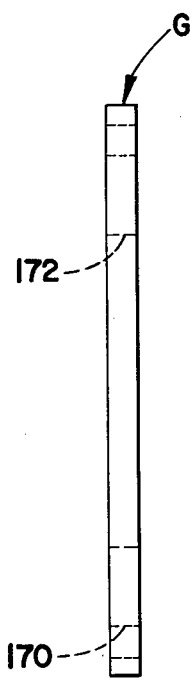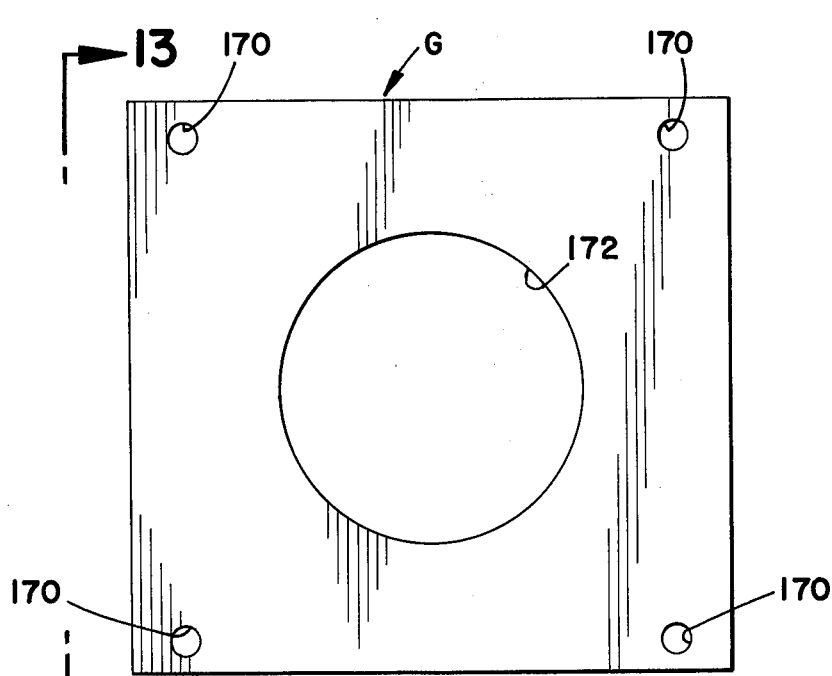
FIG. 13  FIG. 12
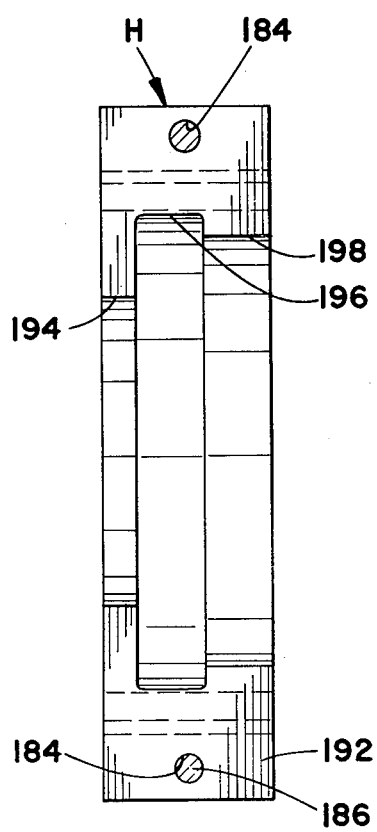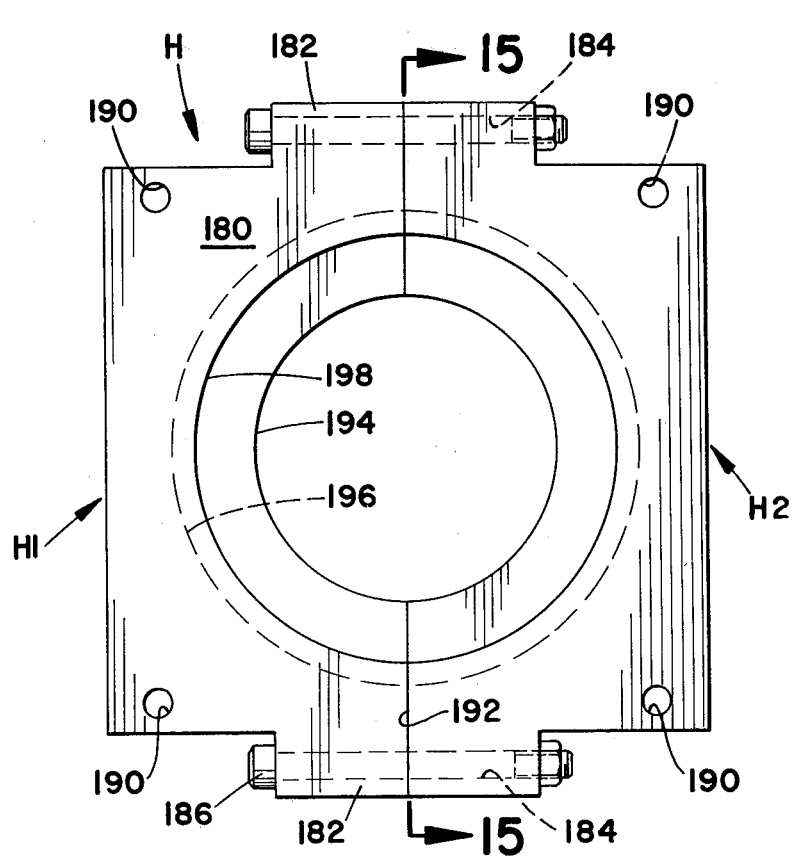
FIG. 15  FIG. 14

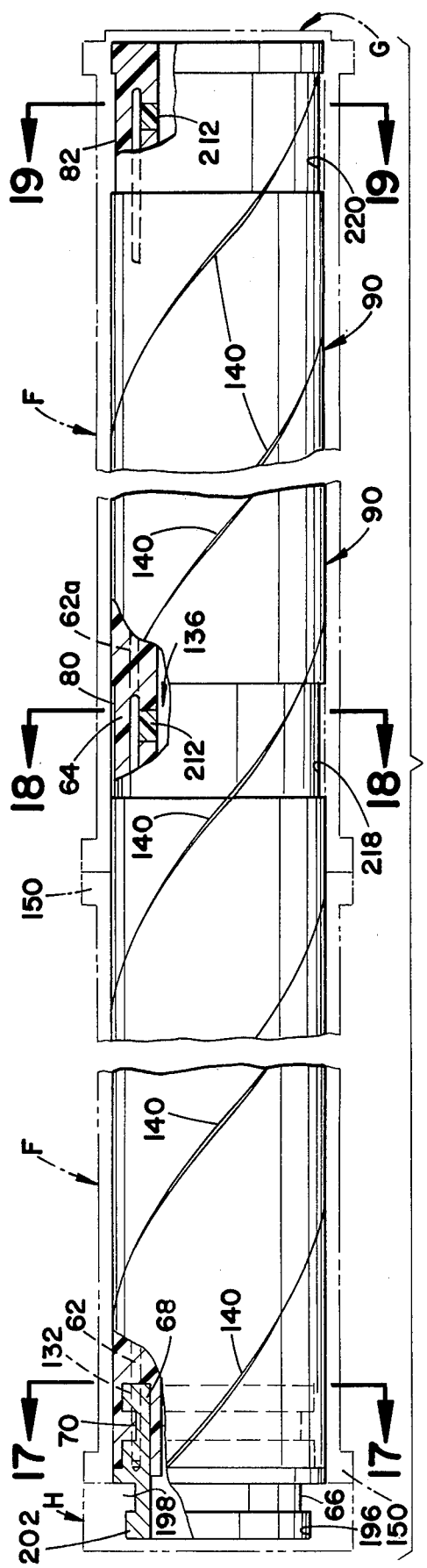
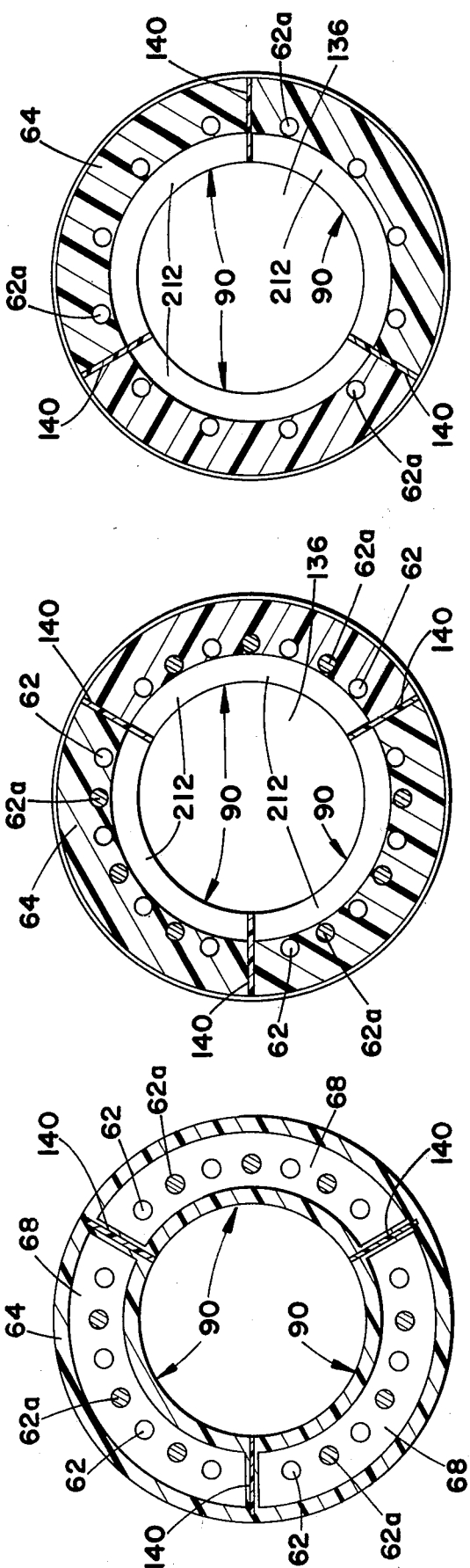

BENDING STRAIN RELIEF

BACKGROUND OF THE INVENTION

This invention relates to the art of strain reliefs and, more particularly, to bending strain reliefs for cable or hose. The subject new bending strain relief assembly is particularly applicable for use at midspan locations of a cable or hose and will be described with particular reference to a clamping head for use at such midspan locations. However, it will be appreciated that the invention has broader applications where, for example, strain relief may be used at terminal end portions of cable or hose. Moreover, certain aspects of the invention may be used for other purposes and with other clamping heads.

Bending strain relief assemblies are commonly applied to terminal end portions of cable or hose. Such assemblies often include helically preformed elements surrounding the terminal end portion of a cable or hose and, in their relaxed condition, have internal passages smaller than the diameter of the associated cable or hose. It is frequently desirable or necessary to provide a bending strain relief at a midspan location of a cable or hose and presently existing arrangements have proven unsatisfactory. It has, therefore, been considered desirable to have a bending strain relief assembly which could be easily applied to midspan locations of cable or hose.

The present invention meets the foregoing needs and others to provide an assembly of the stated type which is simple, effective, reliable and adapted for use in a wide variety of applications and/or environments.

BRIEF SUMMARY OF THE INVENTION

The improved bending strain relief assembly which comprises the present invention is applicable to use with electrical or mechanical cable and with hydraulic or pneumatic hose. Such cable and hose will hereinafter be generally referred to as elongated flexible members.

The new bending strain relief assembly for elongated flexible members includes a plurality of generally helical band members cooperatively interdigitated to define a sleeve having a substantially cylindrical passage therethrough. Each band member includes a plurality of individual preformed elements encapsulated together in synthetic plastic material. The band members have grip means on at least one end portion thereof for engagement with a clamping head. A clamping head has clamping means cooperatively engaging the grip means radially and longitudinally for preventing radial band member separation at the one end portion, and for preventing relative longitudinal movement between the band members and clamping head. Holding means surrounds the band members adjacent the other end portions for preventing radial separation thereof.

In accordance with one arrangement, a first plurality of the preformed elements extend substantially the full length of each band member. Further, a second plurality of the helical elements extend substantially less than the full length of each band member for varying the bending characteristics of the band members along the lengths thereof.

In one construction, each band member has leading and trailing edges extending substantially parallel to one another and axially spaced apart by some predetermined distance. Each band member includes at least two coils having a predetermined pitch which is at least two times the predetermined distance. In other words, the pitch of adjacent coils is a whole multiple, greater than one, of the predetermined distance and the number of band members in the bending strain relief assembly is equal to such whole multiple. With this construction, the interdigitated band members provide a substantially circumferentially closed sleeve surrounding the elongated flexible member.

In the most preferred arrangement, the pitch between adjacent coils of each band member is approximately three times the distance between the leading and trailing edges of a band member extending parallel to the axis thereof.

Each band member has a fitting on one end portion thereof attached to the preformed helical elements and to the plastic material. Also, the fitting includes grip means for cooperation with clamping means on a clamping head.

The fitting on each band may include an external circumferential keying groove with a plurality of generally axial holes intersecting this keying groove. The preformed helical elements have end portions extending through such holes into the keying groove and the keying groove itself is filled by the plastic material which encapsulates the helical elements.

The grip means on each fitting may comprise an external grip groove located intermediate the keying groove and the free end of the fitting. The clamping head may advantageously include internal circumferential grooves spaced axially from a terminal end thereof to define arcuate clamping flanges. These flanges are receivable in the grip grooves for preventing radial separation of the helical band members and for preventing relative longitudinal movement between the band members and the clamping head.

Preferably, the external surfaces of the band members include circumferential recesses for receiving holding means to prevent radial separation of the band members along the lengths thereof. Positioning the holding means in the external circumferential grooves prevents longitudinal movement of the holding means relative to the band members.

The clamping head may be advantageously designed and configured to include means for mounting a cable or hose in any number of different environments for a wide variety of applications. Such alternative clamping head constructions include means for preventing band member separation and for preventing relative longitudinal movement between the head and band members.

The band members used in the bending strain relief assembly may be manufactured by a novel method which includes the steps of providing an elongated generally cylindrical plug having at least two thin parting strips circumferentially spaced substantially equidistantly and extending outwardly therefrom in generally parallel helical paths between the opposite end portions of the plug. The parting strips form generally helical channels along the exterior of the plug. A plurality of individual helical elements are positioned along each of the channels in surrounding relationship to the plug. A mold is then positioned over the plug and strips to substantially enclose the channels. The channels are then filled with plastic material to form generally helical bands defined by the preformed helical elements encapsulated in the plastic material.

It is a principal object of the present invention to provide an improved bending strain relief assembly in which all bending segments are substantially equally stressed at all times in any bend direction and are less likely to be stressed beyond their yield point under extreme conditions.

It is an additional object of the invention to provide an improved bending strain relief assembly which can be readily applied to midspan locations of elongated flexible members.

It is also an object of the invention to provide an improved component for use in a bending strain relief assembly.

It is another object of the invention to provide an improved method of manufacturing generally helical band members having preformed metal wires encapsulated in synthetic plastic material.

Still further objects and advantages for the present invention will become readily apparent to those skilled in the art upon a reading and understanding of the following specification.

BRIEF DESCRIPTION OF THE DRAWINGS

The invention will be described with reference to the following FIGURES wherein the showings are for purposes of illustrating the preferred embodiment only and not for limiting same and wherein:

FIG. 1 is a side elevational view of a bending strain relief assembly constructed in accordance with the present invention;

FIG. 2 is a side elevational view of one-half of the length of the bending strain relief assembly of FIG. 1 with portions thereof cut-away and in cross-section for ease of illustration;

FIG. 2A is a side elevational view of the remaining portion of the bending strain relief assembly not shown in FIG. 2 with portions thereof cut-way for ease of illustration;

FIG. 3 is a cross-sectional elevational view taken generally along lines 3—3 of FIG. 2A;

FIG. 5 is a side elevational view of an adaptor used with the strain relief assembly;

FIG. 6 is an end elevational view taken generally along lines 6—6 of FIG. 5;

FIG. 7 is a side elevational view of a mold plug assembly used to manufacture preformed band members used in the strain relief assembly;

FIG. 8 is an ene elevational view taken generally along lines 8—8 of FIG. 7;

FIG. 9 is a side elevational view of a mold section used to manufacture preformed band members used in the strain relief assembly;

FIG. 10 is a top plan view of the mold section of FIG. 9;

FIG. 11 is an end elevational view taken generally along lines 11—11 of FIG. 9;

FIG. 12 is a front elevational view of one mold end closure used with the mold sections of FIGS. 9–11;

FIG. 13 is a side elevational view taken generally along lines 13—13 of FIG. 12;

FIG. 14 is a front elevational view of an opposite mold end closure used with the mold sections of FIGS. 9–11;

FIG. 15 is a cross-sectional elevational view taken generally along lines 15—15 of FIG. 14;

FIG. 16 is a side elevational view showing the mold members of FIGS. 9–15 in phantom and with helical members of FIG. 4 formed therein;

FIG. 17 is a cross-sectional elevational view taken generally along lines 17—17 of FIG. 16;

FIG. 18 is a cross-sectional elevational view taken generally along lines 18—18 of FIG. 16;

FIG. 19 is a cross-sectional elevational view taken generally along lines 19—19 of FIG. 16;

DETAILED DESCRIPTION OF A PREFERRED EMBODIMENT

Figures 4, 20:
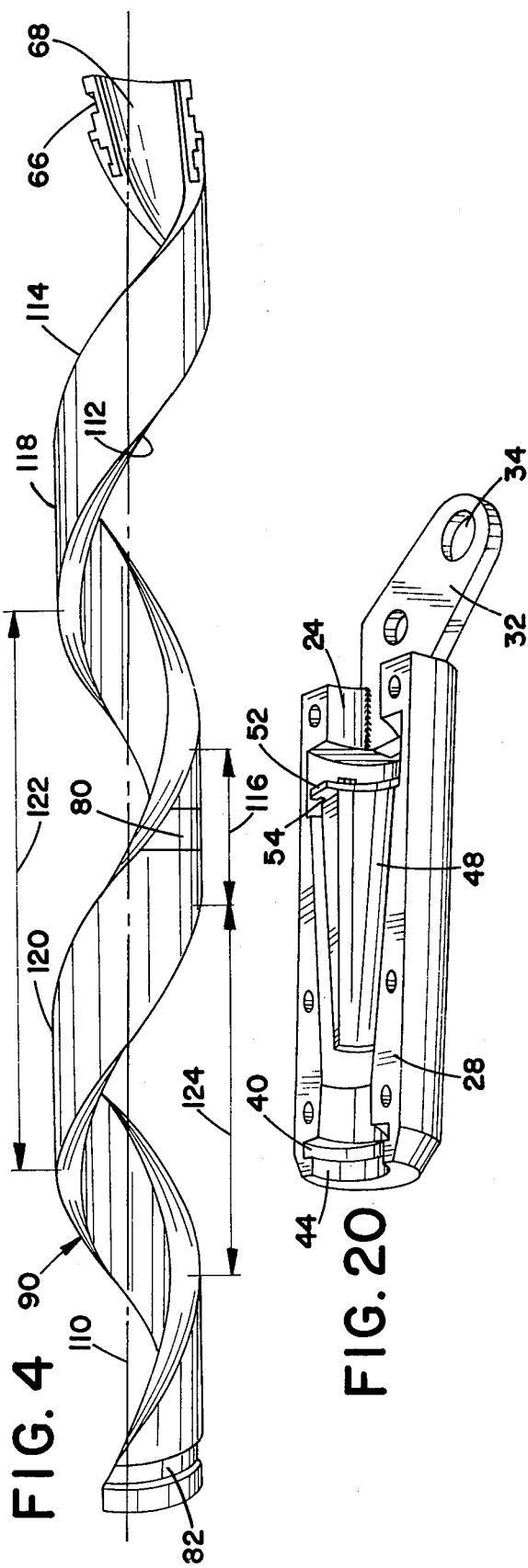
FIG. 4 is a plan view of a preformed generally helical band member used in the subject new bending strain relief assembly.
FIG. 20 is a perspective illustration of one half of a clamping head having an associated wedge member situated therein.

Referring now to the drawings wherein the showings are for purposes of illustrating a preferred embodiment of the invention only and not for purposes of limiting same, FIG. 1 shows an elongated flexible member 12 which may comprise one of an electrical or mechanical cable or a hydraulic or pneumatic hose. Preformed helical rods 14 circumferentially surround elongated flexible member 12 over a predetermined length thereof which is greater than the length thereof surrounded by the improved bending strain relief assembly A of the present application.

Preformed helical rods 14 define chafing rods for protecting elongated flexible element 12 against chafing along the length thereof where it is suspended from a supporting structure. The passage through chafing rods 14 is somewhat smaller than the external diameter of flexible member 12 so that rods 14 mechanically grip flexible member 12. Additional preformed helical rods 16 circumferentially surround chafing rods 14 intermediate the opposite ends thereof. These additional rods have an internal passage somewhat smaller than the external diameter of chafing rods 14 so that rods 16 mechanically grip rods 14. One end portion of rods 16 is held in a clamping head B for providing longitudinal pulling strain relief in a known manner. Suitable circumferential clamps or holding devices generally indicated as at 18, 20 are provided on rods 14 and 16 for preventing radial separation thereof. Rods 14, 16 are of any known desirable type and are applied to flexible member 12 in a known manner including, but not necessarily limited to, the arrangements shown and described in U.S. Pat. No. 2,582,797 issued Jan. 15, 1952, to Runde, U.S. Pat. No. 3,163,706 issued Dec. 29, 1964, to Peterson, or U.S. Pat. No. 3,775,811 issued Dec. 4, 1973, to Smrekar et al.

Bending strain relief assembly A constructed in accordance with the present application is applied to elongated flexible member 12 over chafing rods 14, 16. This bending strain relief assembly includes a clamping head B and a sleeve portion C formed from a plurality of interdigitated preformed helical band members as will hereinafter be described.

With reference to FIG. 2, the clamping head B shown includes a clamping head body having a cylindrical hole or opening 24 therethrough and being longitudinally split along the axis of hole 24 into a pair of separable body parts 26, 28 which are releasably secured together by bolts 30. Mounting means at one end of clamping head B for mounting same to another structure includes a mounting flange 32 on each body part 26, 28 laterally displaced from clamping head hole 24 so that flanges 32 on the body parts extend in parallel spaced apart relationship to one another on opposite sides of flexible member 12 and chafing rods 14. Each mounting flange 32 has suitable transverse holes 34, 36 and 38 therethrough for attaching same to another structure. Elongated flexible member 12 and chafing rods 14 are closely received through elongated cylindrical hole or opening 24 in clamping head B.

The end portion of body parts 26, 28 opposite from the one end portions thereof having mounting flanges 32 are provided with internal circumferential grooves 40 spaced axially from a terminal end 42 of each body part 26, 28 to define an inwardly extending circumferential flange 44 having inner flange surfaces facing toward the axis of clamping hole 24 and lying on the periphery of a circle having a diameter substantially greater than the diameter of hole 24. Body parts 26, 28 have tapered internal surfaces generally indicated at 46 for part 28 and lying on the surface of a cone which converges in a direction from the end of clamping head B having mounting flanges 32 thereon toward the end thereof having flanges 44 thereon. A pair of complementary wedges, only one of which is shown in FIG. 2 as at numeral 48, have external surfaces 50 complementarily shaped to surfaces 46. Arcuate flat plates 52 having circumferentially spaced notches 54 therein are suitably bolted to the large ends of wedges 48 in a known manner. End portions 56 of helical rods 16 are bent outwardly, and positioned between surfaces 46, 50 while also extending through notches 54. An internal generally cylindrical hole or passage 58 defined through wedges 48 clamps against chafing rods 14. Therefore, longitudinal pulling of elongated flexible member 12 and chafing rods 14 in a direction from left to right in FIG. 2 causes wedge members 48 to be urged in the same direction and thereby securely clamp end portions 56 of rods 16 between surfaces 46, 50.

The particular construction for clamping head B described above comprises only one embodiment therefor, it being appreciated that alternative embodiments would be utilized in adapting the bending strain relief assembly to different applications and/or environments. Such alternatives, do not, however, in any way depart from the overall intent or scope of the invention. The clamping head primarily functions to prevent separation of the band members which comprise sleeve portion C and to prevent relative longitudinal movement between the band members and head. Also, clamping head B functions to accommodate mounting of the overall bending strain relief assembly A to some attendant or adjacent structure. In that vein, and by way of one example only, the clamping head could be constructed so as to accommodate a sleeve portion C disposed at each of the clamping head opposed ends.

Sleeve portion C of bending strain relief assembly A is formed from a plurality of interdigitated preformed helical band members. The sleeve portion includes a plurality of preformed helical elements 62 encapsulated in synthetic plastic material 64. Also, the sleeve portion includes an external circumferential groove 66 defining grip means for cooperation with clamping means defined by flange 44 on clamping head B to prevent radial separation of the interdigitated band members which form sleeve portion C and to prevent axial movement of the sleeve portion away from clamping head B. Circumferential groove 64 is formed in a fitting 68 having a circumferential keying groove 70 and a plurality of circumferentially spaced, generally axially extending holes 72 which also intersect keying groove 70. Terminal end portions of preformed helical elements 62 extend into holes 72. Plastic material 64 fills keying groove 70 and bonds to elements 62 for securing end fitting 68 to helical elements 62 and to plastic material 64.

With reference to FIG. 2A, sleeve portion C is shown as having an intermediate external circumferential groove 80 and a free end portion external circumferential groove 82 located adjacent the sleeve portion free end remote from clamping head B. The sleeve portion is formed of three interdigitated band members 90 with circumferential holding devices D being received in grooves 80, 82 in surrounding relationship to the sleeve portion for preventing radial separation of the band members. As shown in FIG. 3, each holding device D includes a pair of opposed cooperating arcuate parts 92, 94 with each part extending over approximately 180 degrees. Part 94 has threaded bores 96 for receiving bolts 98 which extend freely through holes 102 in part 92. Parts 92, 94 are simply positioned in cooperative relationship around sleeve portion C and bolts 98 are then placed in position for securely clamping the parts together. Circumferential holding devices 18, 20 disposed on preformed helical rods 14, 16 may be of the same general construction as circumferential holding devices D.

FIG. 4 shows one of the preformed helical band members 90 which includes a longitudinal axis 110. Helical band member 90 also has leading and trailing edges generally indicated at 112, 114 which extend substantially parallel to one another. These leading and trailing edges are spaced apart by some predetermined distance 116 parallel to longitudinal axis 110. Helical band member 90 includes at least two axially spaced coils generally indicated as at 118, 120 having a pitch 122 which is approximately equal to three times distance 116 between leading and trailing edges 112, 114 parallel to axis 110. This provides an axial spacing 124 between the leading edge of one coil and the trailing edge of an adjacent coil which is approximately two times distance 116.

The internal and external surfaces of band member 90 lie on the surfaces of cylinders. Band members 90 are sufficiently flexible for positioning three of same in an interdigitated cooperating relationship remote from a terminal end of flexible member 12 to define a substantially circumferentially continuous sleeve. The cylindrical passageway defined through helical band member 90 preferably has a diameter slightly less than the external diameter of rods 16 (FIGS. 1 and 2). This means that band members 90 will resiliently grip rods 16 when applied thereto.

FIGS. 5 and 6 show a generally cylindrical fitting member E having external circumferential keying groove 70 and external circumferential grip groove 66 axially spaced from one another. Fitting member E is circumferentially split into three fittings 68 by generally radially extending helical cuts 130 which are equidistantly spaced from each other. A plurality of circumferentially spaced holes 132 extend into fitting member E from the terminal end 134 thereof which is located on the opposite side of keying groove 70 from grip groove 66. Holes 132 may be considered to extend generally axially although it will be recognized from FIG. 5 that they are also inclined to extend generally parallel to cuts 130. The longitudinal axis of each hole 132 makes an included angle with the longitudinal axis of fitting member E of approximately 32 degrees and the holes extend inwardly into the fitting member beyond keying groove 70 as shown in FIG. 5. Each hole 132 is positioned such that an arcuate groove is formed in the bottom of keying groove 70 with each arcuate groove thus formed having a depth approximately equal to the radius of each hole 132. This particular relationship is best shown in FIG. 2. Holes 132 are spaced and positioned such that the conformation of each of the three fittings 68 is approximately the same. Fittings 68 are used in forming band members 90 of FIG. 4.

FIGS. 7 and 8 show a portion of a mold used to form preformed helical band members 90. An elongated cylindrical plug member 136 has three external longitudinal helical grooves 138 spaced equidistantly circumferentially thereof and extending parallel to one another. Three thin nylon parting strips 140 are positioned in grooves 138 and held therein by suitable locking strips 142. This provides three generally helical channels 144 defined externally of the outer surface of plug member 136 between adjacent parting strips 140. Each channel 144 is of approximately the same size and shape.

FIGS. 9-11 show a main mold section F having a cylindrical main body 148 and generally rectangular end flanges 150. Top and bottom extensions 152 have suitable transverse holes 154 therethrough for receiving bolt and nut assemblies 156. End flanges 150 are also provided with axial holes 160 which receive bolt and nut assemblies for securing a plurality of identical mold sections together or for securing end mold closures thereto. Mold section F is longitudinally split into two equal halves F1 and F2 along parting line 162 in FIG. 11, and the halves are secured together by bolt and nut assemblies 156. An elongated opening 166 extends the full length of mold section F between end flanges 150 so that flowable synthetic plastic material may be poured into mold section F along substantially the full length thereof.

FIGS. 12 and 13 show a mold end closure G in the form of a flat rectangular plate of approximately the same size as end flanges 150. Axial holes 170 in the mold end closure are alignable with axial holes 160 in end flanges 150 of mold section F. A central circular hole or opening through end closure G is approximately the same diameter as cylindrical plug member 136 (FIGS. 7 and 8).

FIGS. 14 and 15 show an opposite mold end closure H in the form of a generally rectangular flange 180 of substantially the same size and shape as flange 150 in FIG. 11. Extensions 182 on flange 180 have transverse holes 184 therethrough for receiving bolt and nut assemblies 186. A plurality of axial holes 190 also extend through the flange and are alignable with axial holes 160 in flange 150 of FIG. 11. Numeral 192 represents a parting line which divides mold end closure H into two equal halves H1 and H2 secured together by bolt and nut assemblies 186. A central circular hole or opening through mold end closure H has approximately the same diameter as plug member 136 (FIGS. 7 and 8). The mold end closure H further includes a circumferential groove 196 having opening 194 on one side thereof and a radially inwardly extending circumferential flange 198 on the other side thereof. Circumferential flange 198 has an internal diameter which is approximately the same as the diameter of the bottom of groove 66 in fitting member E of FIG. 5. Likewise, the axial width of flange 198 is approximately the same as the axial width of groove 66 on fitting member E with the diameter of the bottom of circular groove 196 being approximately the same as the external diameter of outwardly extending circumferential flange 202 (FIG. 5). Moreover, the axial width of groove 196 is approximately the same as the axial width of flange 202.

FIGS. 16-19 show how the various components are assembled to form the preformed helical band members. Cylindrical plug member 136 having helical parting strips 140 is provided with arcuate spacers 212 of nylon or the like at an intermediate portion thereof and at one end portion thereof as shown in FIG. 16. These arcuate spacers extend between adjacent ones of parting strips 140. Preformed helical elements 62 preferably comprise metal rods or wires although they may be preformed of other materials, such as synthetic plastic or the like, for certain purposes. A plurality of the preformed helical elements 62 are positioned in each helical channel defined between adjacent parting strips 140 in surrounding relationship to plug member 136. These preformed helical elements include a first plurality of such elements 62 which extend from fitting 68 over slightly more than one-half the length of sleeve portion C and a second plurality of helical elements 62a which extend substantially the full length of sleeve portion C. This arrangement provides sleeve portion C with variable bending characteristics along its length where a greater stiffness is provided between fitting 68 and the ends of helical elements 62 than between the ends of helical element 62 and helical elements 62a. From fitting 68 to the ends of helical elements 62, there are two times the number of helical elements involved as compared to the length of sleeve portion C which has only helical elements 62a therein. Terminal end portions of helical elements 62, 62a are positioned in holes 132 of fittings 68. Fittings 68 are assembled around plug member 136 with parting strips 140 positioned therebetween. Spacers 212 maintain helical elements 62, 62a radially outwardly from the outer surface of plug member 136. Fittings 68 act to serve a similar purpose.

Mold sections F are then assembled around plug member 136 and parting strips 140 being secured together by transverse bolt and nut assemblies 136 (FIG. 11). In the arrangement shown in FIG. 16, two mold sections F are connected in an end-to-end relationship at their flanges 150 to provide a suitable mold length. Mold end closure G is then bolted to flange 150 on one mold section F at one end of the mold assembly with plug member 136 closely received through central opening 172 (FIG. 12) in end closure G. Mold end closure H is also assembled around fittings 68, bolted together and also bolted to flange 150 on the other mold section F. Synthetic plastic material is then fed through longitudinal openings 166 (FIGS. 9-11) to completely fill all of the channels between parting strips 40 with the synthetic plastic material. Once this material has solidified or cured, the various mold sections are disassembled.

The outer edges of parting strips 140 lie on the surface of a cylinder having a diameter slightly less than the internal diameter of mold sections F. The completed part may then be separated from the plug member by convenient means to thereby yield the three band members 90. By way of example only, one such convenient means may comprise simply striking the part with a sharp blow to fracture the plastic material outwardly of parting strips 140. Suitable filler rings generally indicated at 218, 220 in FIG. 16 are positioned within one mold section F to form external circumferential grooves 80, 82.

The arrangement shown and described substantially encapsulates helical elements 62, 62a within plastic material 64. The plastic material fills keying groove 70 and also bonds to the end portions of helical elements 62, 62a exposed in groove 70 so that fittings 68 as well as the helical elements are secured to the synthetic plastic material. Any suitable synthetic plastic material may be used, including but not limited to urethane. Nylon materials may be advantageously employed for spacers 212, fillers 218, 220, mold plug 136 and parting strips 140. Any suitable metal is preferable used for end fittings 68 and helical elements 62, 62a.

FIGS. 17-19 show the cross-sectional shape of each band member 90 taken perpendicular to the longitudinal axis thereof. Each band member 90 has arcuate inner and outer surfaces which extend parallel to one another and lie on the periphery of different diameter circles having a common center. The opposite sides of each band member 90 extend in longitudinal helical paths and also extend generally radially of the center of the circles on which the arcuate inner and outer surfaces lie. The intersecting edges between the opposite side surfaces and the inner and outer surfaces extend parallel to one another in helical paths.

Figure 22:
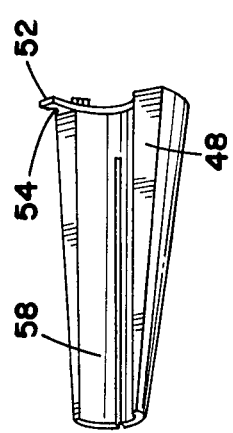
Figure 21:
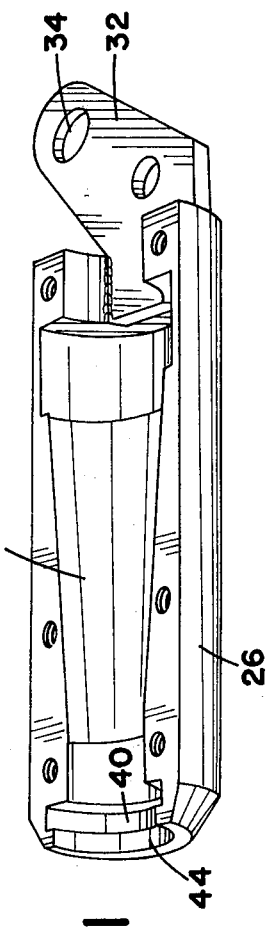
FIG. 21 is a perspective illustration of the other half of the clamping head without a wedge member disposed therein; and, FIG. 22 is a perspective illustration of a wedge member receivable in the clamping head half of FIG. 21.

FIGS. 20-22 show the clamping head described above in a separated condition. Clamping head body part 28 (FIG. 20) includes a separate cooperating wedge half 48 situated therein whereas clamping body half 26 (FIG. 21) is shown without a cooperating wedge member. The wedge member 48 shown in FIG. 22 is typical of an arrangement adapted for use in the particular clamping head structure shown and includes an arcuate plate or washer 52 bolted thereto. The assembled relationship between the wedge members, the clamping body halves, the arcuate plates and end portions 56 of associated helical rods is shown in FIG. 2. The construction of the clamping head may be varied from that shown in FIGS. 20-22 as deemed necessary and/or appropriate to meet specific applications for the bending strain relief assembly.

The invention has been shown and described with reference to a preferred embodiment. It is obvious that equivalent alterations and modifications will occur to others upon a reading and understanding of this specification. It is intended to include all such equivalent alterations and modifications insofar as they come within the scope of the appended claims.

Having thus described the invention, it is now claimed:

1. A bending strain relief assembly for use with elongated flexible members comprising:
a plurality of generally helical band members cooperatively interdigitated and defining a sleeve having a substantially cylindrical passage therethrough, each said band member including a plurality of individual helical elements encapsulated together in synthetic plastic material, said band members and said helical elements being preformed to a generally helical configuration, said band members having grip means on at least one end portion thereof for engagement with a clamping head;
a clamping head having clamping means cooperatively engaging said grip means radially and longitudinally for preventing radial separation of said band members at said one end portion thereof and for preventing relative longitudinal movement between said band members and clamping head; and, holding means around said band members adjacent the other end portions thereof for preventing radial separation thereof.

2. The strain relief assembly as defined in claim 1 wherein a first plurality of said helical elements extends substantially the full length of each said band member and a second plurality of said helical elements extends substantially less than the full length of each said band member for varying the bending characteristics of said band members along the length thereof.

3. The strain relief assembly as defined in claim 2 wherein said second plurality of helical elements extend from said one end portions of said band members having said grip means thereon toward the other end portions thereof.

4. The strain relief assembly as defined in claim 1 wherein each said band member has leading and trailing edges extending substantially parallel to one another and axially spaced apart a predetermined distance, and each said band member includes at least two coils having a predetermined pitch which is at least two times said predetermined distance so that said coils are axially spaced apart a distance at least as great as said predetermined distance.

5. The strain relief assembly as defined in claim 4 wherein said pitch is a whole multiple, greater than one, of said predetermined distance and the number of said band members is equal to said whole multiple.

6. The strain relief assembly as defined in claim 4 wherein said pitch is approximately three times said predetermined distance and there are three of said band members in said assembly.

7. The strain relief assembly as defined in claim 1 wherein each said band member has a fitting on said one end portion thereof, said fitting being attached to said helical elements and to said plastic material, and said fitting has said grip means thereon.

8. The stain relief assembly as defined in claim 1 wherein said band members have external circumferential recesses therein receiving said holding means.

9. The stain relief assembly as defined in claim 1 wherein said clamping head has a longitudinal hole therethrough for receiving an elongated flexible member and is longitudinally split into separate pieces which are releasably secured together, said clamping head having mounting means on one end portion thereof offset from said hole for mounting said clamping head to another structure, and said clamping means being on the other end portion of said clamping head.

10. The strain relief assembly as defined in claim 9 including wedge means in said clamping head for cooperation with wires to hold same to said clamping head.

11. A component of a bending strain relief assembly for elongated flexible members comprising:
a preformed member having opposite end portions and being generally helically coiled about a longitudinal axis between said end portions, said member including a plurality of individual generally helically coiled preformed elements substantially encapsulated in synthetic plastic material, said member having a substantially plane inner surface lying generally on the surface of a cylinder;
said member having generally helical leading and trailing edges along the length thereof, said leading and trailing edges being substantially parallel and being spaced apart a predetermined distance parallel to said axis, and said member having at least two coils axially spaced from one another parallel to said axis a distance which is at least as great as said predetermined distance; and a fitting on one of said preformed member end portions with said preformed elements having end portions communicating with said fitting.

12. The component as defined in claim 11 wherein said coils have a pitch which is approximately three times said predetermined distance.

13. A component as defined in claim 11 wherein said preformed elements comprise wires.

14. The component as defined in claim 11 wherein a first plurality of said preformed elements extends substantially the full length of said preformed member between said opposite end portions thereof and a second plurality of said preformed elements extends from one of said end portions toward the other of said end portions over a distance substantially less than the full length of said member.

15. The component as defined in claim 11 wherein said opposite end portions have external circumferential recesses therein.

16. The component as defined in claim 15 including an intermediate external circumferential groove in said preformed member intermediate said opposite end portions.

17. The component as defined in claim 11, said fitting being attached to both said preformed elements and to said plastic material and including grip means for radial and axial engagement by a clamping head.

18. A clamping head for a strain relief assembly used with elongated flexible members comprising:

a body having a substantially straight hole therethrough for receiving an elongated flexible member, said body being longitudinally split generally along the axis of said hole into separable pieces which are releasably secured together, mounting means on one end portion of said pieces displaced from said hole for mounting said body to another structure, the other end portions of said pieces including internal arcuate circumferential grooves spaced axially from a terminal end of said pieces to define arcuate flanges, said flanges having flange surfaces facing toward the axis of said hole which lie on the periphery of a circle having a diameter substantially greater than the diameter of said hole, said pieces intermediate the opposite end portions thereof having tapered internal surfaces lying generally on the surface of a cone and converging in a direction from said one end portion of said pieces toward the other end portion thereof, wedges received in said pieces and having external surfaces generally complementarily shaped to said tapered internal surfaces, and said wedges having internal surfaces forming an axial portion of said hole.

19. A bending strain relief assembly for use with elongated flexible members comprising:

a plurality of generally helical band members cooperatively interdigitated and defining a sleeve having a substantially cylindrical passage therethrough, each said band member including a plurality of individual helical elements encapsulated together in synthetic plastic material, each said band member having a fitting on at least one end portion thereof attached to said helical elements and to said plastic material and including grip means for engagement with a clamping head;

said fitting having an external circumferential keying groove therein and a plurality of generally axial holes intersecting said keying groove, said helical elements having end portions extending through said holes into said keying groove, and said keying groove being filled by said plastic material which is bonded to said end portions of said helical elements;

a clamping head having clamping means cooperatively engaging said grip means radially and longitudinally for preventing radial separation of said band members at said one end portion thereof and for preventing relative longitudinal movement between said band members and clamping head; and holding means around said band members adjacent the other end portions thereof for preventing radial separation thereof.

20. The strain relief assembly as defined in claim 19 wherein said fitting has a free end and including an external grip groove intermediate said keying groove and said free end, and said grip means being defined by said grip groove.

21. A component of a bending strain relief assembly for elongated flexible members comprising:

a preformed member having opposite end portions and being generally helically coiled about a longitudinal axis between said end portions, said member including a plurality of individual generally helically coiled preformed elements substantially encapsulated in synthetic plastic material, said member having a substantially plane inner surface lying generally on the surface of a cylinder;

said member having generally helical leading and trailing edges along the length thereof, said leading and trailing edges being substantially parallel and being spaced apart a predetermined distance parallel to said axis, said member having at least two coils axially spaced from one another parallel to said axis a distance which is at least as great as said predetermined distance;

a fitting on one of said end portions of said preformed member, said fitting having an external circumferential keying groove therein and a plurality of axial holes intersecting said keying groove, said preformed elements having end portions extending through said holes into said keying groove, and said keying groove being filled with said plastic material.

22. The component as defined in claim 21 wherein said fitting has a free end and includes an external circumferential grip groove intermediate said keying groove and said free end.

* * * * *